(12) United States Patent
Wong

(10) Patent No.: US 9,204,387 B2
(45) Date of Patent: Dec. 1, 2015

(54) POWER SAVING

(75) Inventor: Shin Horng Wong, Chippenham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 20 days.

(21) Appl. No.: 13/702,672

(22) PCT Filed: Jun. 6, 2011

(86) PCT No.: PCT/EP2011/002767
§ 371 (c)(1),
(2), (4) Date: Feb. 28, 2013

(87) PCT Pub. No.: WO2011/157364
PCT Pub. Date: Dec. 22, 2011

(65) Prior Publication Data
US 2013/0163492 A1    Jun. 27, 2013

(30) Foreign Application Priority Data

Jun. 18, 2010 (EP) .................................. 10360027

(51) Int. Cl.
*H04J 1/00* (2006.01)
*H04W 52/02* (2009.01)
*H04L 5/00* (2006.01)

(52) U.S. Cl.
CPC ........... *H04W 52/0212* (2013.01); *H04L 5/001* (2013.01); *H04L 5/0098* (2013.01); *H04W 52/0232* (2013.01); *H04L 5/0058* (2013.01); *H04L 5/0091* (2013.01); *Y02B 60/50* (2013.01)

(58) Field of Classification Search
CPC ..... H04L 5/0012; H04L 5/0098; H04L 5/001; H04W 16/02; H04W 72/0453
USPC .......... 370/311, 343, 480, 485, 302, 348, 482
See application file for complete search history.

(56) References Cited

U.S. PATENT DOCUMENTS 5,784,572 A *  7/1998  Rostoker et al. ............... 709/247
8,184,599 B2 *  5/2012  Gholmieh et al. ............. 370/335
(Continued)

FOREIGN PATENT DOCUMENTS

EP     2317686 A1    5/2011
JP     2012-510237   4/2012
(Continued)

OTHER PUBLICATIONS

ZTE, ( "Carrier activation for 4C-HSDPA") 2009,3GPP TSG RAN WG1 #59; pp. 1-5.*
(Continued)

*Primary Examiner* — Ricky Ngo
*Assistant Examiner* — Dewanda Samuel
(74) *Attorney, Agent, or Firm* — Fay Sharpe LLP

(57) ABSTRACT

A method and network node operable to perform a method of controlling a carrier configuration of a network node in a multi-carrier wireless telecommunication network. The multi-carrier wireless telecommunications network comprises a plurality of network nodes operable to simultaneously transmit and receive signals on more than one radio frequency carrier within a sector of the telecommunications network. The method comprises the steps of: monitoring an indication data traffic received over a predetermined time period on each carrier to determine whether the data traffic received over the time period meets a predetermined set of conditions, transmitting a request to deactivate each carrier determined to meet the conditions; monitoring for receipt of a positive response to the request and implementing deactivation for each carrier for which a positive response is received.

15 Claims, 4 Drawing Sheets

(56) References Cited

U.S. PATENT DOCUMENTS

| | | | |
|---|---|---|---|
| 8,358,594 B2* | 1/2013 | Lee et al. | 370/254 |
| 8,514,732 B2* | 8/2013 | Gholmieh et al. | 370/252 |
| 8,582,638 B2* | 11/2013 | Earnshaw et al. | 375/240 |
| 8,693,381 B2* | 4/2014 | Zhang et al. | 370/311 |
| 8,711,709 B2* | 4/2014 | Marinier et al. | 370/242 |
| 8,976,694 B2* | 3/2015 | Feuersanger et al. | 370/252 |
| 2009/0296643 A1* | 12/2009 | Cave et al. | 370/329 |
| 2010/0130137 A1* | 5/2010 | Pelletier et al. | 455/68 |
| 2010/0130219 A1 | 5/2010 | Cave et al. | |
| 2010/0303039 A1* | 12/2010 | Zhang et al. | 370/331 |
| 2010/0322175 A1* | 12/2010 | Chen | 370/329 |

FOREIGN PATENT DOCUMENTS

| | | |
|---|---|---|
| WO | WO 2007/120085 A1 | 10/2007 |
| WO | WO 2010/068487 | 6/2010 |

OTHER PUBLICATIONS

Huawei, "Considerations on Dual-Band optimizations for 4C-HSDPA," 3$^{rd}$ Generation Partnership Project (3GPP), 3GPP TSG RAN WG1 Meeting #60bis, R1-102275, XP050419528, 2 pages, Beijing, China, Apr. 12-16, 2010.

Ericsson et al., "UE DRX for 4C-HSDPA," 3$^{rd}$ Generation Partnership Project (3GPP), 3GPP TSG RAN WG1 Meeting #61, R1-102622, XP050419839, 5 pages, Montreal, Canada, May 10-14, 2010.

International Search Report for PCT/EP2011/002767 dated Aug. 9, 2011.

"Dynamic activation and deactivation of secondary carrier for DC-HSUPA," 3$^{rd}$ Generation Partnership Project (3GPP), 3GPP TSG-RAN WG2 #66, R2-093158, San Francisco, USA, May 5-9, 2009, 4 pages.

"Timer based implicit deactivation for Dual Band 4C-HSDPA," 3$^{rd}$ Generation Partnership Project (3GPP), 3GPP TSG-RAN WG1 #61, R1-102927, Montreal, Canada, May 10-14, 2010, 2 pages.

"Power saving solutions for 4C-HSDPA," 3$^{rd}$ Generation Partnership Project (3GPP), 3GPP TSG-RAN WG1 #60bis, R1-102073, Beijing, China, Apr. 12-16, 2010, 3 pages.

"Timer based de-activation of secondary carrier in Dual Band 4C-HSDPA," 3$^{rd}$ Generation Partnership Project (3GPP), 3GPP TSG-RAN WG1 #60bis, R1-101993, Beijing, China, Apr. 12-16, 2010, 3 pages.

Huawei, "Considerations on Dual-Band Optimization for 4C-HSDPA," 3GPP TSG RAN WG1 Meeting #60bis, R1-102275, Apr. 12-16, 2010.

Ericsson, "UE DRX for 4C-HSDPA" 3GPP TSG RAN WG1 #61, R1-102622, May 10, 2010.

* cited by examiner

TRADITIONAL UMTS ARCHITECTURE

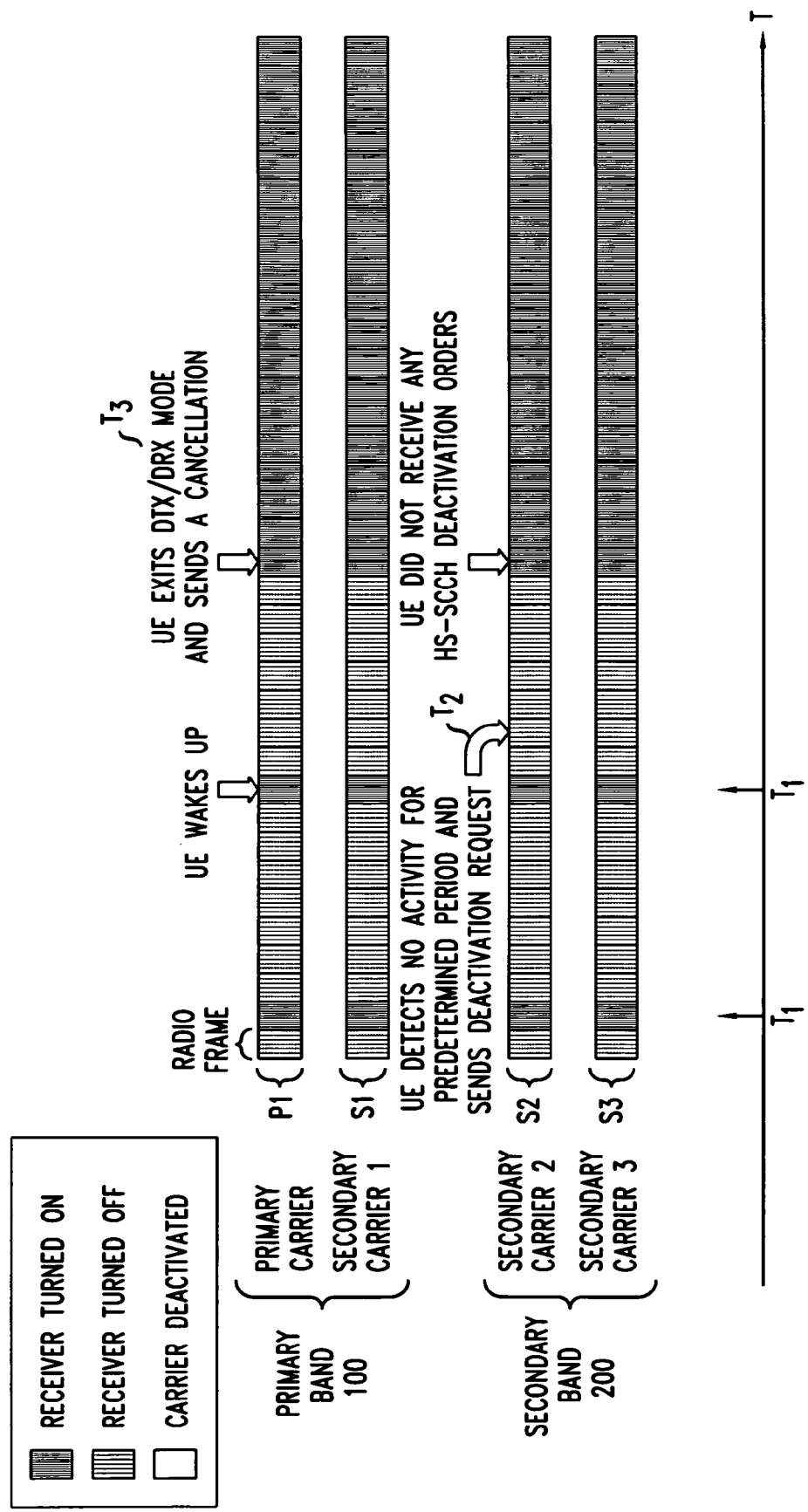

POWER SAVING

FIELD OF THE INVENTION

The present invention relates to a method of controlling a power saving mode of user equipment in a multi-carrier wireless telecommunications network, and a computer program product and user equipment operable to carry out that method.

BACKGROUND

Single carrier wireless telecommunications systems are known. In those systems, radio coverage is provided to user equipment, for example, mobile telephones, by geographical area. A base station is located in each geographical area to provide required radio coverage. User equipment in an area served by a base station receives information and data from a base station and transmits information and data to a base station.

Information and data transmitted by a base station to user equipment occurs on channels of radio carriers known as "downlink carriers". Information and data transmitted by user equipment to a base station occurs on uplink data channels of radio carriers known as "uplink carriers".

An area served by a base station typically comprises several sectors which together define a coverage area for that base station. Typically, a base station serves three sectors. Those sectors are typically served by separate antenna arrays provided on a base station.

It is possible to allow base stations and user equipment to each transmit simultaneously on more than one carrier. Furthermore, it is possible to allow user equipment and base stations to receive simultaneously on more than one carrier frequency. Such multi-carrier networks allow for an increase in data throughput across the network when the network is busy. However, those same networks typically require provision of an increase in hardware and increased power consumption to provide full functionality, which may not be energy efficient when data traffic across the network is low.

It is desired to provide a multi-carrier network having improved power consumption characteristics.

SUMMARY

Accordingly, a first aspect provides a method of controlling a carrier configuration of a network node in a multi-carrier wireless telecommunication network, the multi-carrier wireless telecommunications network comprising a plurality of network nodes operable to simultaneously transmit and receive signals on more than one radio frequency carrier within a sector of the telecommunications network, the method comprising the steps of:
  monitoring an indication data traffic received over a predetermined time period on each carrier to determine whether the data traffic received over the time period meets a predetermined set of conditions,
  transmitting a request to deactivate each carrier determined to meet the conditions;
  monitoring for receipt of a positive response to the request and implementing deactivation for each carrier for which a positive response is received.

It is possible to allow base stations and user equipment to each transmit simultaneously on more than one carrier. Furthermore, it is possible to allow user equipment and base stations to receive simultaneously on more than one carrier frequency.

In such a scenario, each carrier, both uplink and downlink, is individually and independently power controlled.

Dual Cell High Speed Uplink Packet Access (DC-HSUPA) will allow user equipment to transmit (uplink) data on two adjacent frequency carriers. This allows for an increase in data throughput from user equipment relative to a single carrier arrangement. In 4 Carrier High Speed Downlink Packet Access (4C-HSDPA) user equipment can receive (and a base station can transmit on) up to four simultaneous downlink carriers from a base station.

In 4C-HSDPA, a sector is defined as the geographical coverage area of a base station (also known as a Node B). A sector can consist of several cells, where each cell aims to cover the same geographical coverage as the sector and uses a separate frequency carrier for its transmission.

Each carrier in a multi-carrier network can be within the same frequency band, or region of radio spectrum, or distributed over two or more frequency bands provided in the radio spectrum.

Multi-carrier systems allow for an increase in data throughput from user equipment and from a base station. The term "multi carrier network" used herein is envisaged to cover both DC-HSDPA, 3C-HSDPA, 4C-HSDPA and MC-HSDPA networks.

In a typical multi-carrier wireless telecommunications network, one of the downlink carriers provided will typically be known as an "anchor" or "primary" carrier. The anchor carrier has a particular functional purpose and whilst user equipment and base stations may be able to receive and transmit on one or more carrier simultaneously, the anchor uplink and downlink carriers are the carriers upon which a base station monitors, controls and instructs various functional aspects of a relationship between user equipment and a base station including, for example, mobility events. That is to say, an anchor carrier provides essential control channels for downlink and uplink operation and mobility events are managed based upon measurements made by user equipment and reported on an anchor carrier uplink.

In a multi-carrier system, there will typically be provided one "primary" or "anchor" carrier and one or more "secondary" carriers. The secondary carriers are indexed as: secondary carrier 1, secondary carrier 2, secondary carrier 3, etc. Since the primary carrier contains essential control channels, it cannot be deactivated without affecting operation of the wireless telecommunication network and, in particular, operation of the user equipment. The primary carrier is therefore typically not deactivated.

Autonomous user equipment deactivation of a downlink carrier which is being received may save some power at user equipment, but may disrupt base station scheduling since the base station may expect all downlink carriers to be active. A base station scheduler allocates downlink resources and also transmits packets to user equipment. Hence, if a base station schedules transmissions on a secondary carrier, it expects that this secondary carrier is "activated" (able to be received) at the user equipment. If a base station scheduler is unaware that reception of a secondary carrier has been deactivated by user equipment, it may continue to retransmit packets to the user equipment. That retransmission can cause unnecessary interference in cell, detrimentally affecting the operation of the network.

In the downlink it is beneficial that a base station knows when reception of downlink secondary carriers has been deactivated. The first aspect recognizes that a possible solution is to allow user equipment to request, secondary carrier deactivation.

One such a request has been received by a base station, it may decide, based on a set of predetermined criteria, whether to deactivate the requested secondary carriers. If accepted, a base station may instruct deactivation of secondary downlink carriers, and send an instruction to user equipment.

In accordance with the first aspect, user equipment takes no action to deactivate reception of a carrier until a positive response is received. In such a scenario it will be appreciated that a base station remains in control of deactivation of downlink secondary carriers and this will not disrupt the base station scheduler.

In one embodiment, the predetermined set of conditions comprise an indication that substantially no data is being received on a carrier. Accordingly, it will be understood that a request for deactivation will only be sent when user equipment determines that activity on that carrier is sufficiently low, thereby minimising potential disruption to operation of the user equipment.

In one embodiment, the wireless telecommunications network is operable to simultaneously transmit and receive signals on more than one radio frequency carrier, the radio frequency carriers comprising a primary carrier and at least one secondary carrier, the carriers being spread over two predetermined frequency bands, the primary carrier being provided in a primary frequency band and at least one of the secondary carriers being provided in a secondary frequency band.

Carriers in a multi-carrier network may be provided in one predetermined frequency band, or may be provided across two or more predetermined frequency bands. Those bands are provided in the radio spectrum. If all carriers in a multi-carrier network are provided in a single frequency band, that band is known as the primary band. If the carriers are spread over two predetermined frequency bands, the frequency band that contains the primary carrier is known as the primary band and the frequency band that contains only secondary carriers is referred to as the secondary band.

User equipment which is capable of receiving multi-carrier downlink carriers configured over a primary and secondary band may require two receiver chains, one for each frequency band. An energy saving may be achieved if, in periods of appropriate network activity, user equipment is able to deactivate the receiver chain for the secondary band.

Accordingly, once a request has been received by a base station, it may decide, based on a set of predetermined criteria, whether to deactivate the requested secondary carriers.

Since energy saving can be best achieved by shutting off an entire receiver chain, it will be appreciated that it offers greatest power savings to request to deactivate a group of secondary carriers attached to a receiver chain, for example, the set of secondary carriers located within the secondary band. Or for a base station to recognize that all carriers meeting the predetermined criteria are in the secondary band, and send an appropriate response to the requests.

In one embodiment, the monitoring step further comprises the step of monitoring each carrier provided in the secondary band to determine whether the data traffic received over the time period meets the predetermined set of conditions. Accordingly, user equipment may itself be operable to determine all carriers in the secondary band are sufficiently inactive for a secondary band receiver chain to request to be turned off.

In one embodiment, the transmitting step further comprises the step of transmitting a secondary band deactivation request when all carriers provided in the secondary band are determined to meet the predetermined set of conditions. Accordingly, rather than send an independent request for each carrier, user equipment may be operable to recognise that the carriers in the secondary band meet inactivity criteria and transmit a single request, representing a request to deactivate a secondary band receiver chain.

In one embodiment, the method further comprises the step of deactivating secondary band reception on receipt of a positive response for all of the carriers provided in said secondary band. Accordingly, no reduction in functionality is implemented until approval and permission is received from a base station, thus minimising disruption to the network.

In one embodiment, the deactivation request comprises a layer 1 signalling message. In one embodiment, the deactivation request comprises a layer 2 signalling message. It will be appreciated that such low level signalling ensures that the request and response can be implemented rapidly. User equipment may be operable to send a deactivation request to a base station in a number of ways, including, for example, at Layer 1 using a reserved E-TFCI (E-DCH Transport Format Combination Indicator) in E-DPCCH (E-DCH Dedicated Physical Control Channel); at Layer 1 using a reserved Channel Quality Indication (CQI) codeword (e.g. CQI value of 31); A new Layer 1 message; at Layer 2 adding 3 bits or 1 bit to MAC message, such additional bits may only be sent when a deactivation request is needed; or a new Layer 2 message.

In one embodiment, the method further comprises the step of transmitting a cancellation request when it is determined a carrier no longer meets the predetermined conditions. Accordingly, it is recognised that, after user equipment sends an deactivation request which has not been actioned by a base station, the conditions being experienced by user equipment may change. For example, user equipment may receive data traffic on all carriers mode and no longer wish to deactivate any secondary carriers. In such a case, user equipment may operate to send another request to the base station, which cancels the deactivation request sent previously. The cancellation request may be sent using similar or analogous signalling to that used for the initial deactivation request.

In one embodiment, the method steps are performed whilst the wireless telecommunication network node is operating in discontinuous transmission or reception mode.

User equipment may be operable to operate in a "discontinuous reception" (DRx) or "discontinuous transmission" (DTx) mode. Such modes allow user equipment to save battery power when the UE is in an inactive period (for example, when user equipment is in an idle state). During discontinuous reception user equipment shuts down its reception antenna and periodically wakes up to receive possible data traffic and information, for example, paging messages, from wireless telecommunications network via data sent on downlink channels to user equipment from a base station. If the messages received by user equipment in the wake-up periods are deemed to exceed a threshold, or indicate that base station wishes to send more information to user equipment, user equipment is operable to exit from the discontinuous reception mode.

Similarly, a discontinuous transmission (DTx) mode may be implemented by user equipment. In such a case, when in a substantially idle mode, user equipment shuts down its transmitter and only wakes up periodically to transmit packets of data to the network via uplink channels to the base station. Implementing carrier deactivation whilst in discontinuous mode allows greater power savings to be made. It will be understood that if already operating in discontinuous mode data traffic is already likely to be low.

A second aspect provides a computer program product, operable when executed on a computer, to perform the method of the first aspect.

A third aspect provides a network node operable to control a carrier configuration in a multi-carrier wireless telecommunication network, the multi-carrier wireless telecommunications network comprising a plurality of network nodes operable to simultaneously transmit and receive signals on more than one radio frequency carrier within a sector of the telecommunications network, the network node comprising:

monitoring logic operable to monitor an indication data traffic received over a predetermined time period on each carrier to determine whether the data traffic received over the time period meets a predetermined set of conditions, transmission logic operable to transmit a request to deactivate each carrier determined to meet the conditions;

response logic operable to monitor for receipt of a positive response to the request and implement deactivation for each carrier for which a positive response is received.

In one embodiment, the predetermined set of conditions comprise an indication that substantially no data is being received on a carrier.

In one embodiment, the wireless telecommunications network is operable to simultaneously transmit and receive signals on more than one radio frequency carrier, the radio frequency carriers comprising a primary carrier and at least one secondary carrier, the carriers being spread over two predetermined frequency bands, the primary carrier being provided in a primary frequency band and at least one of the secondary carriers being provided in a secondary frequency band.

In one embodiment, the monitoring logic is further operable to perform the step of monitoring each carrier provided in the secondary band to determine whether the data traffic received over the time period meets the predetermined set of conditions.

In one embodiment, the transmission logic is further operable to transmit a secondary band deactivation request when all carriers provided in the secondary band are determined to meet the predetermined set of conditions.

In one embodiment, the network node comprises deactivation logic operable to deactivate secondary band reception on receipt of the positive response for all of the carriers provided in said secondary band. That deactivation step may comprise deactivation of a reception chain associated with a secondary band.

In one embodiment, the transmission logic is further operable to transmit a cancellation request when it is determined a carrier no longer meets the predetermined conditions.

In one embodiment, the method steps are performed whilst the wireless telecommunication network node is operating in discontinuous transmission or reception mode.

In one embodiment, the network node comprises user equipment. In one embodiment, the network node comprises a base station.

A fourth aspect provides a method of controlling a carrier configuration of a network node in a multi-carrier wireless telecommunication network, the multi-carrier wireless telecommunications network comprising a plurality of network nodes operable to simultaneously transmit and receive signals on more than one radio frequency carrier within a sector of the telecommunications network, the method comprising the steps of:

monitoring for a request to deactivate each carrier, the request being indicative that, over a predetermined time period, data traffic on that carrier has been determined to meet a predetermined set of conditions determining, in response to the request to deactivate each carrier, whether a set of carrier deactivation conditions have been met, and transmitting a positive response to the request if the carrier deactivation conditions have been met.

Accordingly, it will be understood that the fourth aspect provides a method to be implemented by a network node in response to receipt of a request issued in accordance with the first aspect.

In one embodiment, the method further comprises the steps of:

storing an indication of receipt of the request and
periodically repeating the step of determining.

Accordingly, if conditions at a base station are not initially suitable to instruct deactivation of a carrier determined to meet predetermined conditions (for example, if there are data packets to be sent), but those conditions are later met, a positive response may still be sent.

In one embodiment, the carrier deactivation conditions comprise an indication that a carrier is not scheduled to be used for transmission for a predetermined time period. Accordingly, it will be understood that a positive response may only be sent when a base station scheduler indicates that it is sensible to do so in view of network conditions.

A fifth aspect provides a computer program product, operable when executed on a computer, to perform the method of the fourth aspect.

A sixth aspect provides a network node operable to control carrier configuration in a multi-carrier wireless telecommunication network, the multi-carrier wireless telecommunications network comprising a plurality of network nodes operable to simultaneously transmit and receive signals on more than one radio frequency carrier within a sector of the telecommunications network, the network node comprising:

request monitoring logic operable to monitor for a request to deactivate each carrier, the request being indicative that, over a predetermined time period, data traffic on that carrier has been determined to meet a predetermined set of conditions;

determination logic, operable to determine, in response to the request to deactivate each carrier, whether a set of carrier deactivation conditions have been met, and response transmission logic operable to transmit a positive response to the request if said carrier deactivation conditions have been met.

In one embodiment, the network node further comprises:
indication logic operable to store an indication of receipt of said request and repetition logic operable to periodically repeat said step of determining.

In one embodiment, the set of carrier deactivation conditions comprise an indication that a carrier is not scheduled to be used for transmission for a predetermined time period.

Further particular and preferred aspects of the present invention are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings in which:

FIG. 4 illustrates schematically a method of deactivating secondary downlink carriers in response to user equipment request according to a further embodiment.

DESCRIPTION OF THE EMBODIMENTS

Figure 1:
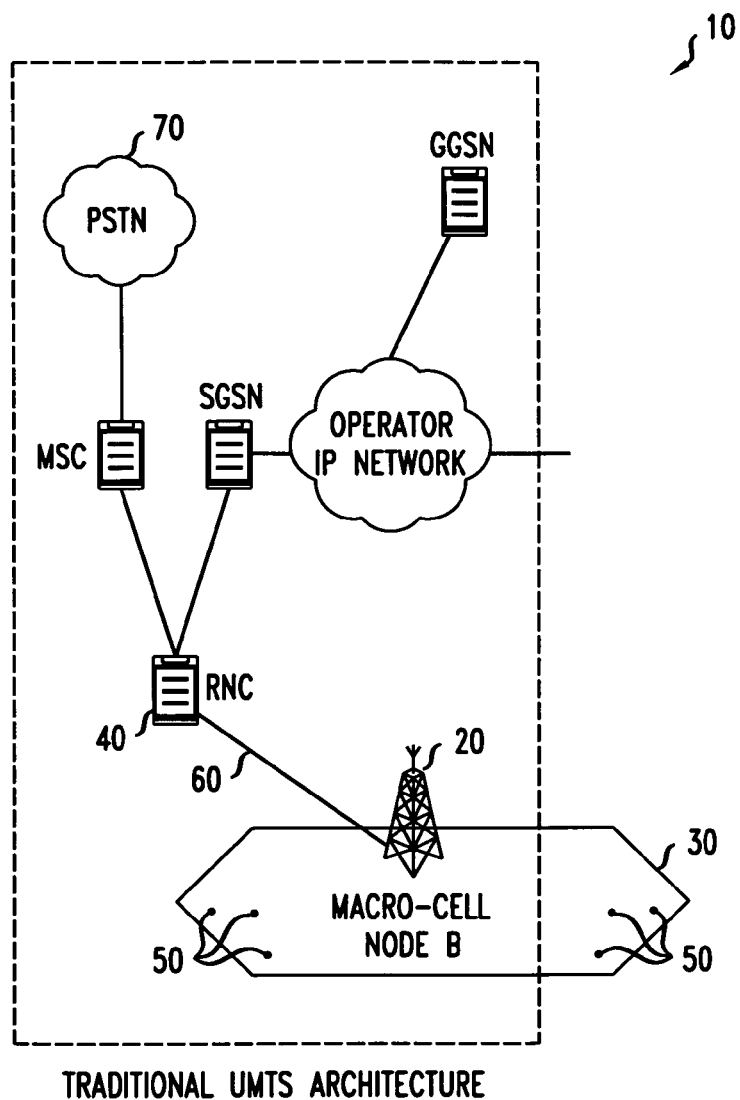
FIG. 1 illustrates the main components of a telecommunications network according to one embodiment.

FIG. 1 illustrates a wireless telecommunications system 10 according to one embodiment. User equipment 50 roam through the wireless telecommunications system. Base stations 20 are provided which support areas of radio coverage 30. A number of such base stations 20 are provided and are distributed geographically in order to provide a wide area of coverage to user equipment 50. When user equipment is within an area served by a base station 30, communications may be established between the user equipment and the base station over associated radio links. Each base station typically supports a number of sectors within the geographical area of service 30.

Typically, a different antenna within a base station supports each associated sector.

Accordingly, each base station 20 has multiple antennae and signals sent through the different antennae, are electronically weighted to provide a sectorized approach. Of course it will be appreciated that FIG. 1 illustrates a small subset of the total number of user equipment and base stations that may be present in a typical communication system.

The wireless communications system is managed by a Radio Network Controller (RNC) 40. The RNC 40 controls operation of the wireless communications system by communicating with a plurality of base stations over a backhaul communications link 60. The network controller also communicates with user equipment 50 via each base station and thus effectively manages the entire wireless communications system.

In a multi carrier system each sector served by a base station can have several carrier frequencies or "carriers" associated therewith. A carrier or cell supported by a carrier covers the same geographical region as a sector. Each cell is served by a different carrier frequency. It will therefore be understood that in a single carrier system the cell is equivalent to a sector since a sector has only one cell or carrier frequency. Nonetheless, in a multi carrier network each sector may comprise several cells, each cell being served simultaneously by a different carrier frequency.

User equipment 50 typically transmits information and data to a base station 20 so that it can be re-routed within a wireless telecommunications network. User equipment may, for example, need to transmit data to the base station in order to relay text messages, voice information when a user is using the equipment to make a telephone call, or other data. The base station 20, in combination with parameters set by the RNC 40, allocate a resource to user equipment in a manner that aims to optimise operation of the wireless telecommunications network 10. User equipment 50 can send data to a base station on one or more carriers known as "uplink carriers".

A base station in a multi-carrier system is operable to communicate and send data and information to user equipment on a set of down link carriers. In a multi carrier system, having either multi carrier uplink or multi carrier downlink, each carrier will have substantially independent downlink radio links from a base station to user equipment and vice versa. The downlink radio links are managed independently, since each carrier will likely have different radio publication paths to user equipment.

In a multi carrier system it has been agreed that one of the carriers will act as a so-called anchor or primary carrier. The anchor carrier functionally operates such that it is used as a basis upon which mobility events, handover, and other control In one embodiment of a multi carrier system, known as 4 Carrier High Speed Downlink Packet Access Network (4C-HSDPA), a sector is defined as the geographical coverage area of a base station. The sector consists of several cells, in which each cell aims to cover the same geographical area as the sector. Each cell uses a separate frequency carrier for transmission. Each frequency carrier can be provided within the same frequency band or distributed over two frequency bands. 4C-HSDPA offers the possibility of user equipment being able to receive up to four simultaneous downlink transmissions from four different cells, from one base station. It can therefore be understood that 4C-HSDPA can potentially quadruple the downlink throughput of a single carrier network. 4C-HSDPA consists of one primary (or anchor) carrier and up to three secondary carriers. The secondary carriers are indexed as secondary carrier 1, secondary carrier 2, and secondary carrier 3. The primary carrier contains essential control channels and cannot be deactivated without causing disruption to communication between a user equipment and the base station. It will be understood that any one or more of the secondary downlink carriers can be deactivated by a base station without substantially disrupting communication and control between user equipment and a base station, and that as long as a primary uplink carrier remains in operation, one or more secondary uplink carriers, if provided, may be deactivated without disrupting communication between user equipment and a base station.

Carriers in a multi-carrier network may be provided in one predetermined frequency band, or may be provided across two or more predetermined frequency bands. Those bands are provided in the radio spectrum. If all carriers in a multi-carrier network are provided in a single frequency band, that band is known as the primary band. If the carriers are spread over two predetermined frequency bands, the frequency band that contains the primary carrier is known as the primary band and the frequency band that contains only secondary carriers is referred to as the secondary band.

Figure 2:
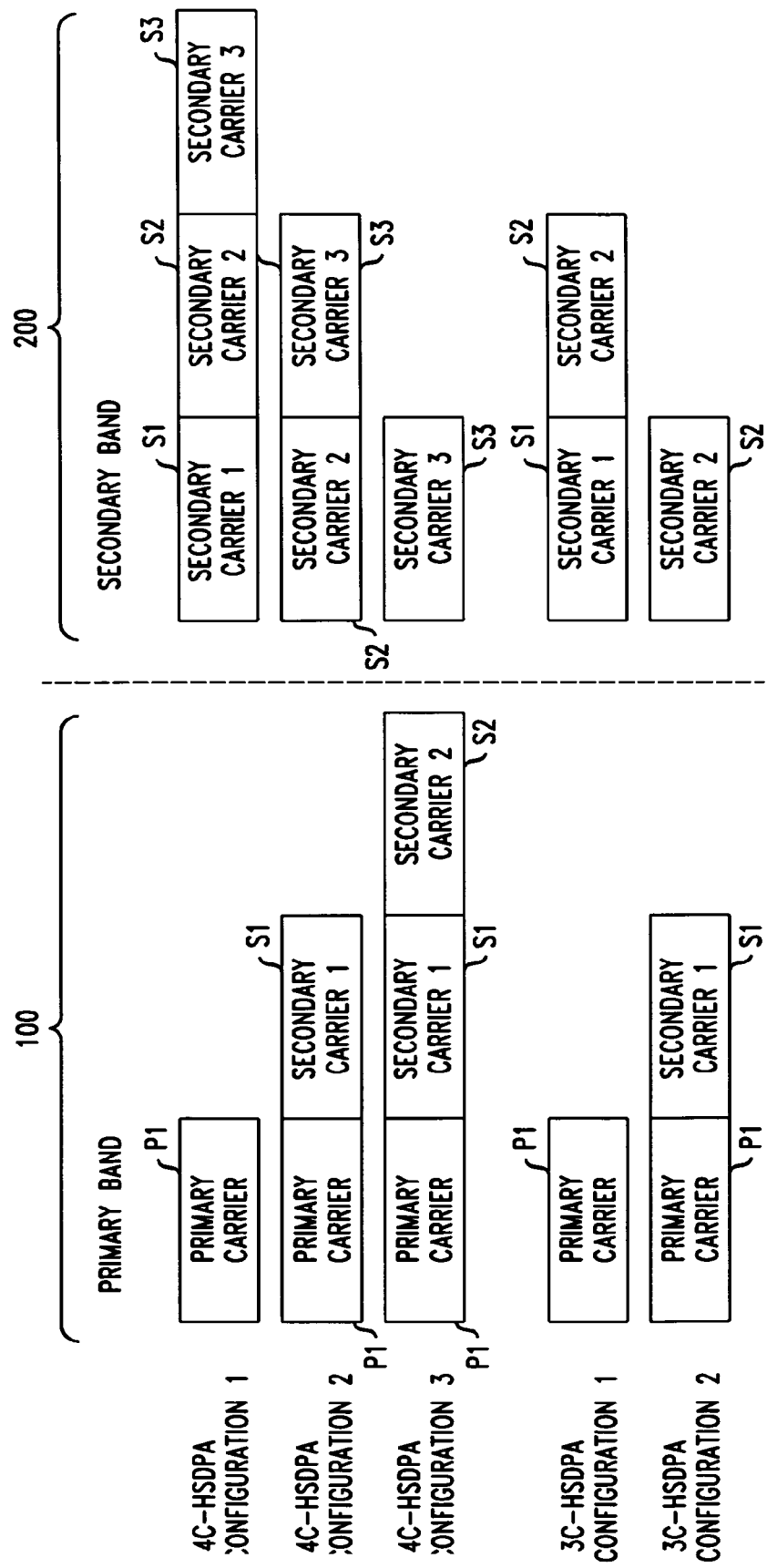
FIG. 2 illustrates schematically various configurations of primary and secondary downlink carriers across a primary and secondary band for a four and three carrier multi-carrier network.

FIG. 2 illustrates schematically various configurations of primary and secondary downlink carriers across a primary and secondary band for a four and three carrier multi-carrier network. Throughout the Primary band is denoted as 100, the secondary band as 200. A primary carrier P1 is provided in primary band 100. That primary band may also contain one or more secondary carriers S1, S2, S3. The secondary band 200 contains only one or more secondary carriers S1, S2, S3.

User equipment 50 which is capable of receiving multi-carrier downlink carriers configured over a primary and secondary band may require two receiver chains, one for each frequency band. An energy saving may be achieved if, in periods of appropriate network activity, user equipment 50 is able to deactivate the receiver chain for the secondary band.

Autonomous user equipment deactivation of a receiver chain may, however, disrupt base station scheduling since the base station may expect the downlink carriers in the secondary band to be active. This may particularly be true if a base station and user equipment are operating according to a discontinuous transmission and/or reception mode in order to save energy.

User equipment 50 may operate in a "discontinuous reception" (DRx) or "discontinuous transmission" (DTx) mode. Such modes allow user equipment 50 to save battery power when the UE is in an inactive period (for example, when user equipment is in an idle state).

During discontinuous reception user equipment 50 shuts down its reception antenna and periodically wakes up to receive possible data traffic and information, for example, paging messages, from wireless telecommunications network 10 via data sent on downlink channels to user equipment 50 from base station 20. If the messages received by user equipment 50 in the wake-up periods are deemed to exceed a threshold, or indicate that base station 20 wishes to send more information to user equipment 50, user equipment is operable to exit from the discontinuous reception mode.

Similarly, a discontinuous transmission (DTx) mode may be implemented by user equipment. In such a case, when in a substantially idle mode, user equipment shuts down its transmitter and only wakes up periodically to transmit packets of data to the network 10 via uplink channels to the base station 20.

In UMTS, the UE can be in an idle (i.e. not connected) or a Connected mode. A UE in idle mode does not have a Radio Resource Control (RRC) connection. If a UE is RRC connected, it can be in one of five different RRC states, namely, Cell_DCH, Cell_FACH, Enhanced Cell_FACH, Cell_PCH and URA_PCH states. A UE usually moves into Cell_DCH state when its traffic is high. In Cell_DCH the DRx/DTx cycle is a function of the Connection Frame Number (CFN), which has a size of 256 giving a maximum DRx/DTx cycle of 0.256 seconds. The DRx/DTx cycle is expected to be short in Cell_DCH given the high traffic at the UE.

Cell_DCH state is one of RRC states where the UE is capable of high download (and upload) throughputs using HSDPA transport channels. In Cell_DCH, the network can allow the UE to operate in Discontinuous Transmission (DTx) and/or Discontinuous Reception (DRx) if the UE detects a pre-determined period of inactivity (uplink or downlink). In DTx the UE shuts off its transmitter and turns it on periodically to transmit the uplink pilot or when it needs to send essential control information (e.g. Scheduling Information). Similarly in DRx, the UE shuts its receiver and only turns it on to periodically turns on to receive data or when it needs to receive essential control information. This is to conserve energy and extend the UE battery life.

If autonomously deactivating a secondary band receiver chain, UE 50 may continuously transmit a NULL CQI (Channel Quality Index) on the primary uplink carrier in relation to secondary carriers in the deactivated secondary band, thereby implicitly indicating to a base station 20 that those carriers have been deactivated.

Such a method leaves a base station 20 essentially unaware that the UE 50 has deactivated the secondary band receiver chain, since a NULL CQI is still interpreted as the carrier being active but in a poor radio condition.

A base station may eventually deactivate such a downlink carrier but that deactivation is based on implementation at the base station. If the UE re-activates a secondary band reception chain and associated carriers, those reactivated carriers begin to report valid CQI but the base station 20 may, depending on implementation criteria, not instantly schedule high resources to that UE on those reactivated carriers since it has been in poor radio condition for a period of time.

It is possible to implement secondary carrier deactivation such that a wireless communications network 10 provides a configurable timer to each secondary carrier to user equipment 50. On entry to a DTx/DRx mode user equipment 50 may start these timers for each of their carriers and if there is no traffic activity when the timer expired, the UE may automatically deactivate the secondary carrier whose timer has expired.

Use of such timers give a base station some time to prepare the scheduling for secondary carrier deactivation by user equipment. However, since user equipment may autonomously move into DTx/DRx mode, a base station will need to estimate when a UE has entered DTx/DRx mode and hence a base station will not typically be aware of when the timers have started. A base station can only estimate the start and end of the timer which leads to uncertainty of the UE downlink secondary carrier activation status. In the case where a base station is aware of the timer, it may lose synchronization with the timer since it is possible that the timer may be restarted if the user equipment receives data. For example, a base station sends a packet to user equipment, but user equipment fails to receive it. User equipment may sent a DTx, to indicate no packet has been received but the base station may misinterpret it as an acknowledgement and wrongly assume a timer has been reset. Meanwhile, the timer at UE times out and the UE deactivates a carrier, leaving a base station unaware of that deactivation.

It is possible for a network to give permission to a UE to allow autonomous secondary carrier deactivation but restrict this to secondary carriers provided in a secondary band. Reactivation of carriers that are autonomously deactivated may then only be performed by a base station. Such a method still faces the problem that a base station may be unaware that a secondary carrier has been deactivated by a UE. If a base station is unaware that a carrier is deactivated, it will not act to activate it and thus UE may lose operability and data throughput offered by a secondary downlink carrier leading to lower than possible throughput performance.

A base station scheduler allocates downlink resources and also transmits packets to the UE. Hence, if a base station schedules transmissions on a secondary carrier, it expects that this secondary carrier is "activated" (able to be received) at the UE. If a base station scheduler is unaware that reception of a secondary carrier has been deactivated by user equipment 50 it may continue to retransmit packets to the UE. That retransmission can cause unnecessary interference in cell 30.

In the downlink it is beneficial that a base station knows when reception of downlink secondary carriers has been deactivated. A solution is to allow user equipment to request, secondary carrier deactivation via layer 1 or layer 2 signalling.

One such a request has been received by a base station, it may decide, based on a set of predetermined criteria, whether to deactivate the requested secondary carriers.

Since energy saving can be best achieved by shutting off a receiver chain, it will be appreciated that it offers greatest power savings to UE to request to deactivate a group of secondary carriers attached to a receiver chain, for example, the set of secondary carriers located within the secondary band.

Requesting individual deactivation of secondary carriers in a four carrier system may require 3 bits in the request, where each bit represents the deactivation request for a secondary carrier (e.g. 1=request to deactivate, 0=no change). Alternatively, if UE is allowed to only request to turn off all secondary carriers in the secondary band, only 1 bit is required.

Upon receiving a request, a base station can decide to accept (or ignore) the UE request from user equipment. If accepted, a base station may instruct deactivation of secondary downlink carriers by using the existing carrier reconfiguration orders (HS-SCCH) orders to deactivate the requested downlink secondary carriers. In such a scenario it will be appreciated that a base station remains in control of deactivation of downlink secondary carriers and this will not disrupt the base station scheduler.

It is possible that, after user equipment 50 sends a deactivation request which has not been actioned by a base station, the conditions being experienced by user equipment may change. For example, user equipment may exit DTx/DRx mode and no longer wish to deactivate any secondary carriers. In such a case, UE sends another request to the base station, which cancels the deactivation request sent previously. The cancellation request may be sent using the same 3 bits used for the initial deactivation request, for example, the UE can send "000" indicating a cancel (or no change to secondary carrier activation status). In the case where UE has used 1 bit to request for deactivation of all carriers in the Secondary Band, the UE can send a "0" indicating cancellation of previous request.

If the base station has failed to receive the previous deactivation request from user equipment and then receives a cancellation request, a base station can be configured to ignore the cancellation since it cannot have performed any deactivation/activation to the UE secondary carriers based on the initial deactivation request.

Figure 3:
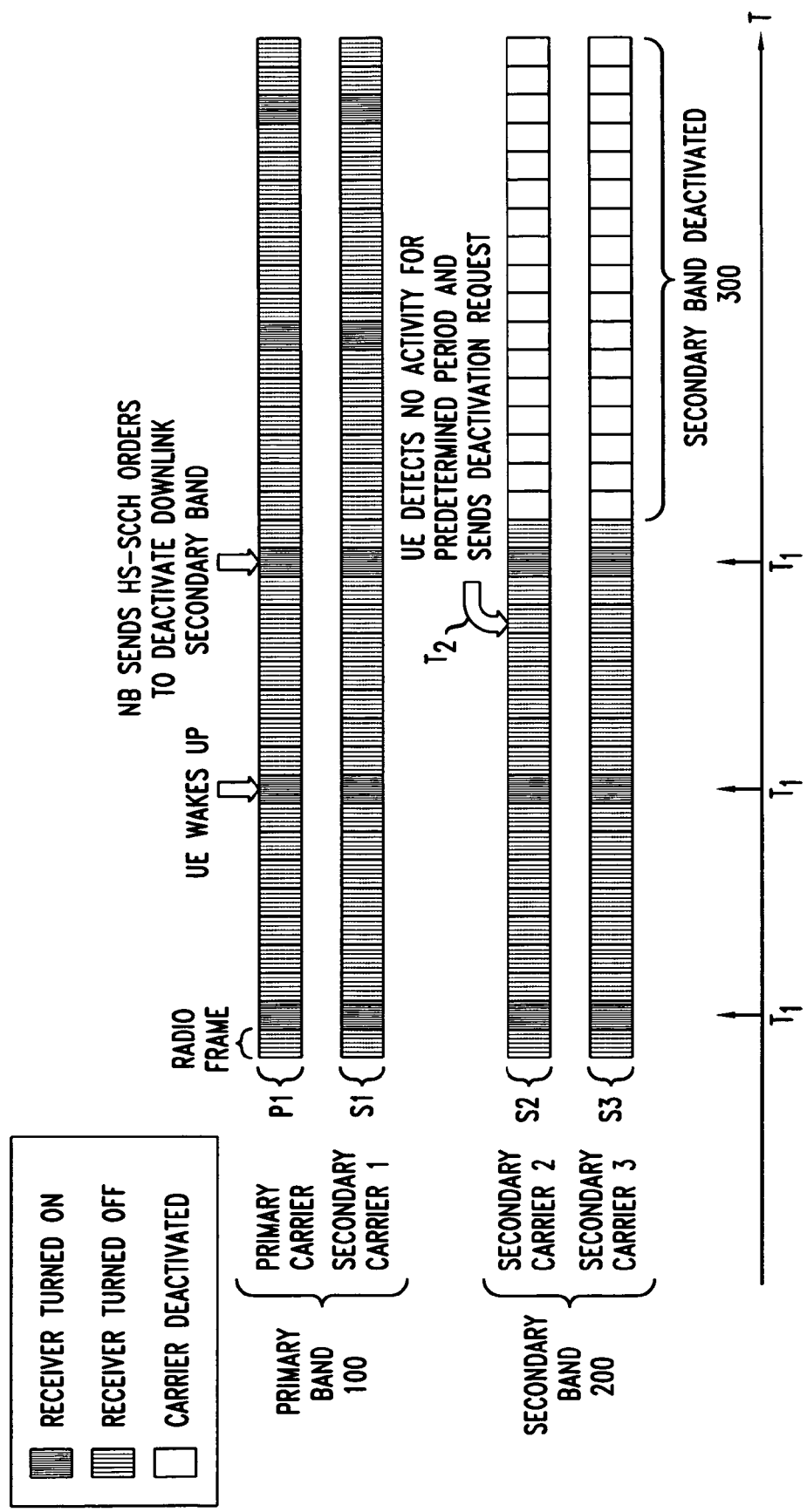
FIG. 3 illustrates schematically a method of deactivating secondary downlink carriers in response to user equipment request according to one embodiment.

User equipment 50 may be operable to send a deactivation request to a base station in a number of ways, including, for example:
- At Layer 1 using a reserved E-TFCI (E-DCH Transport Format Combination Indicator) in E-DPCCH (E-DCH Dedicated Physical Control Channel).
- At Layer 1 using a reserved Channel Quality Indication (CQI) codeword (e.g. CQI value of 31).
- A new Layer 1 message
- At Layer 2 adding 3 bits or 1 bit to MAC message. These additional bits may only be sent when a deactivation request is needed.
- A new Layer 2 message FIG. 3 illustrates schematically a method of deactivating secondary downlink carriers in response to user equipment request according to one embodiment. In the example shown in FIG. 3, a four downlink carrier multi-carrier network is provided, having four carriers: a primary carrier P1, and three secondary carriers S1, S2, S3. P1 and S1 are provided in primary band 100. S2 and S3 are provided in secondary band 200.

As illustrated schematically in FIG. 3, UE is operating in DRx mode, and receivers "wake up" at time slots indicated as T1.

If the user equipment detects no activity on the downlink carriers for a predetermined period of time, it may be configured to decide that the receiver chain corresponding to the Secondary Band can be switched off to save energy. In the example illustrated, a 3 bit request is used by the UE to indicate which secondary carrier it wishes to deactivate. Here 1=deactivate and 0=no change and $1^{st}$ bit=Secondary Carrier 1, $2^{nd}$ bit=Secondary Carrier 2 and $3^{rd}$ bit=Secondary Carrier 3. In this example, to deactivate the Secondary Band, the UE would send "011" to the NB. The deactivation request is sent at T2.

The base station receiving the request evaluates its scheduler and, if conditions are met, for example, there are no packets scheduled to be sent on the secondary carriers in the immediate futures, can decide to grant the UE request. If the request is granted, the base station sends a carrier reconfiguration order (HS-SCCH order) to the user equipment to deactivate Secondary Carrier 2 and Secondary Carrier 3.

When the carriers in the Secondary Band are deactivated, the UE can turn off this receiver chain. This deactivation is shown as period 300 in FIG. 3.

FIG. 4 illustrates schematically a method of deactivating secondary downlink carriers in response to user equipment request according to a further embodiment.

The carrier configuration is initially analogous to that shown in FIG. 3 and reference numerals and letters have been reused as appropriate.

The UE is in DRx and detects no activity for a predetermined amount of time and decides to request that the receiver chain corresponding to the Secondary Band be be switched off to save energy. A 3 bit request is sent at T2 by the UE to indicate which secondary carriers it wishes to deactivate. In this case, 1=deactivate and 0=no change and $1^{st}$ bit=Secondary Carrier 1, $2^{nd}$ bit=Secondary Carrier 2 and $3^{rd}$ bit=Secondary Carrier 3. To deactivate the Secondary Band, the UE would send "011" to the NB.

In the scenario shown in FIG. 4, the base station either fails to receive the request or decides to execute this request at a later time and no carrier reconfiguration order is sent to the user equipment.

Since the UE does not receive any HS-SCCH order to deactivate any secondary carriers, it continues to operate with all the downlink secondary carriers in the secondary band active.

At time T3, the UE exit the DTx/DRx mode, for example, because a user wishes to make a call. Since the user equipment is not aware whether the base station is still processing the previous deactivation request, it sends a cancellation with bit pattern "000". On receiving the cancellation request, the base station may choose to ignore it (if it failed to receive the initial request) or it will cancel the UE previous request to deactivate downlink carriers in the Secondary Band.

Whilst the examples of FIG. 3 and FIG. 4 relate to use of a deactivation method in which user equipment is in discontinuous transmission and reception mode, it will be appreciated that the method may be used whilst the user equipment is not operating in such discontinuous modes.

The method described allows user equipment to request to turn off one ore more secondary carriers, thereby saving energy and battery life. By using a request system, to which a base station may respond, the base station scheduler is not disrupted and the base station remains in control of the downlink secondary carrier deactivation process.

The base station may, of course, deactivate secondary carriers using appropriate reconfiguration orders, even if no request has been received from user equipment, in order to save energy. The method does, however, allow user equipment to have some level of control, and is now wholly slave to the base station, since it can request deactivation.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of controlling a carrier configuration of user equipment in a multi-carrier wireless telecommunication network, said multi-carrier wireless telecommunications network comprising a plurality of network nodes operable to substantially simultaneously transmit and receive signals on more than one active radio frequency carrier within a sector of said telecommunications network, said method comprising:
monitoring, by said user equipment, an indication of data traffic received on at least one carrier to determine whether said data traffic received over a predetermined time period meets a predetermined set of conditions;
transmitting, from said user equipment, a request to deactivate said at least one carrier determined to meet said predetermined set of conditions; and
monitoring, by said user equipment, for receipt of a positive response to said request granting permission to deactivate said at least one carrier determined to meet said predetermined set of conditions and implementing deactivation, at said user equipment, for said at least one carrier for which a positive response is received.

2. A method according to claim 1, wherein said predetermined set of conditions comprise an indication that substantially no data is being received on said at least one carrier.

3. A method according to claim 1, wherein said wireless telecommunications network is operable to simultaneously transmit and receive signals on more than one radio frequency carrier, said radio frequency carriers comprising a primary carrier and at least one secondary carrier, said carriers being spread over two predetermined frequency bands, said primary carrier being provided in a primary frequency band and at least one of said secondary carriers being provided in a secondary frequency band.

4. A method according to claim 3, wherein said monitoring further comprises monitoring at least one carrier provided in said secondary band to determine whether said data traffic received over said predetermined time period meets said predetermined set of conditions.

5. A method according to claim 3, wherein said transmitting further comprises transmitting a secondary band deactivation request when all carriers provided in said secondary band are determined to meet said predetermined set of conditions.

6. A method according to claim 3, further comprising deactivating secondary band reception on receipt of said positive response for all of said carriers provided in said secondary band.

7. A method according to claim 1, wherein said method further comprises transmitting a cancellation request when it is determined a carrier no longer meets said predetermined conditions.

8. A method according to claim 1, wherein said method is performed whilst said user equipment is operating in discontinuous transmission or reception mode.

9. A non-transitory computer readable medium including instructions, which when executed by at least one processor, cause the at least one processor to perform the method of claim 1.

10. User equipment configured to control a carrier configuration in a multi-carrier wireless telecommunication network, said multi-carrier wireless telecommunications network comprising a plurality of network nodes operable to substantially simultaneously transmit and receive signals on more than one active radio frequency carrier within a sector of said telecommunications network, said user equipment comprising:
monitoring logic configured to monitor an indication of data traffic received over a predetermined time period on at least one carrier to determine whether said data traffic received meets a predetermined set of conditions;
transmission logic configured to transmit a request to deactivate said at least one carrier determined to meet said predetermined set of conditions; and
response logic configured to monitor for receipt of a positive response to said request granting permission to deactivate said at least one carrier determined to meet said predetermined set of conditions and implement deactivation for said at least one carrier for which a positive response is received.

11. A method of controlling a carrier configuration of user equipment in a multi-carrier wireless telecommunication network, said multi-carrier wireless telecommunications network comprising a plurality of network nodes operable to substantially simultaneously transmit and receive signals on more than one active radio frequency carrier within a sector of said telecommunications network, said method comprising:
  monitoring by a base station for a request from said user equipment to deactivate at least one carrier said request being indicative that data traffic on said at least one carrier has been determined to meet a predetermined set of conditions
  determining, by said base station, in response to said request to deactivate said at least one carrier, whether a set of carrier deactivation conditions have been met, and
  transmitting, by said base station a positive response to said request to said user equipment granting permission to deactivate said at least one carrier if said carrier deactivation conditions have been met.

12. A method according to claim 11, further comprising:
  storing at said base station an indication of receipt of said request from said user equipment; and
  periodically repeating said determining.

13. A method according to claim 11, wherein said set of carrier deactivation conditions comprise an indication that a carrier is not scheduled to be used for transmission for a predetermined time period.

14. A non-transitory computer readable medium including instructions, which when executed by at least one processor, cause the at least one processor to perform the method of claim 11.

15. A base station configured to control associated user equipment carrier configuration in a multi-carrier wireless telecommunication network, said multi-carrier wireless telecommunications network comprising a plurality of network nodes operable to substantially simultaneously transmit and receive signals on more than one active radio frequency carrier within a sector of said telecommunications network, said base station comprising:
  request monitoring logic configured to monitor for a request from said user equipment to deactivate at least one carrier said request being indicative that, over a predetermined time period, data traffic on said at least one carrier has been determined to meet a predetermined set of conditions;
  determination logic, configured to determine, in response to said request from said user equipment to deactivate said at least one carrier, whether a set of carrier deactivation conditions have been met; and
  response transmission logic configured to transmit to said user equipment a positive response to said request granting permission to deactivate said at least one carrier if said carrier deactivation conditions have been met.

* * * * *